Dec. 17, 1935.  A. URFER  2,024,313
ALTIMETER
Filed April 2, 1932  3 Sheets-Sheet 1
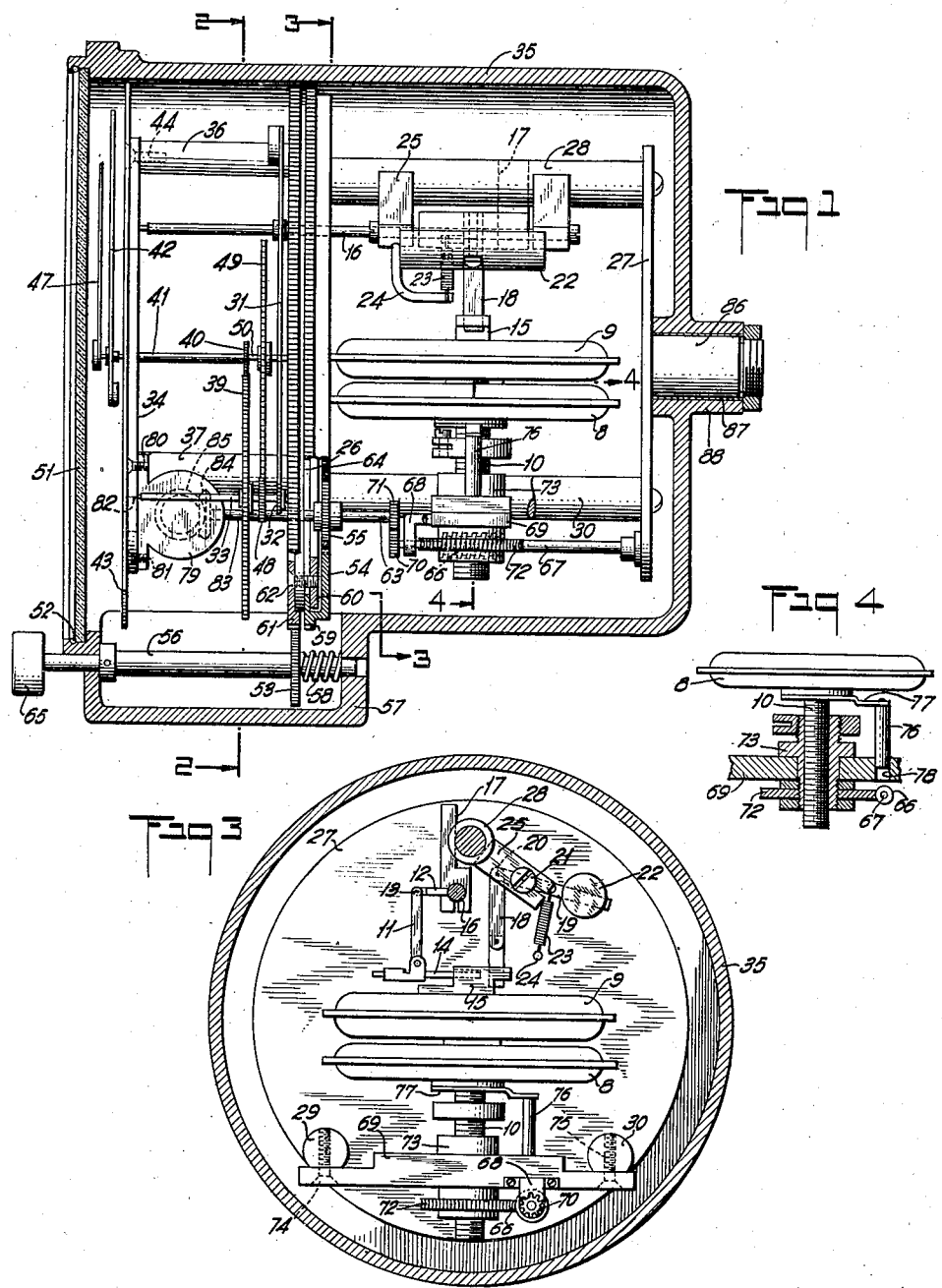
INVENTOR.
ADOLF URFER.
BY Stephen Cerstvik
ATTORNEY.

Dec. 17, 1935.  A. URFER  2,024,313
ALTIMETER
Filed April 2, 1932   3 Sheets-Sheet 2
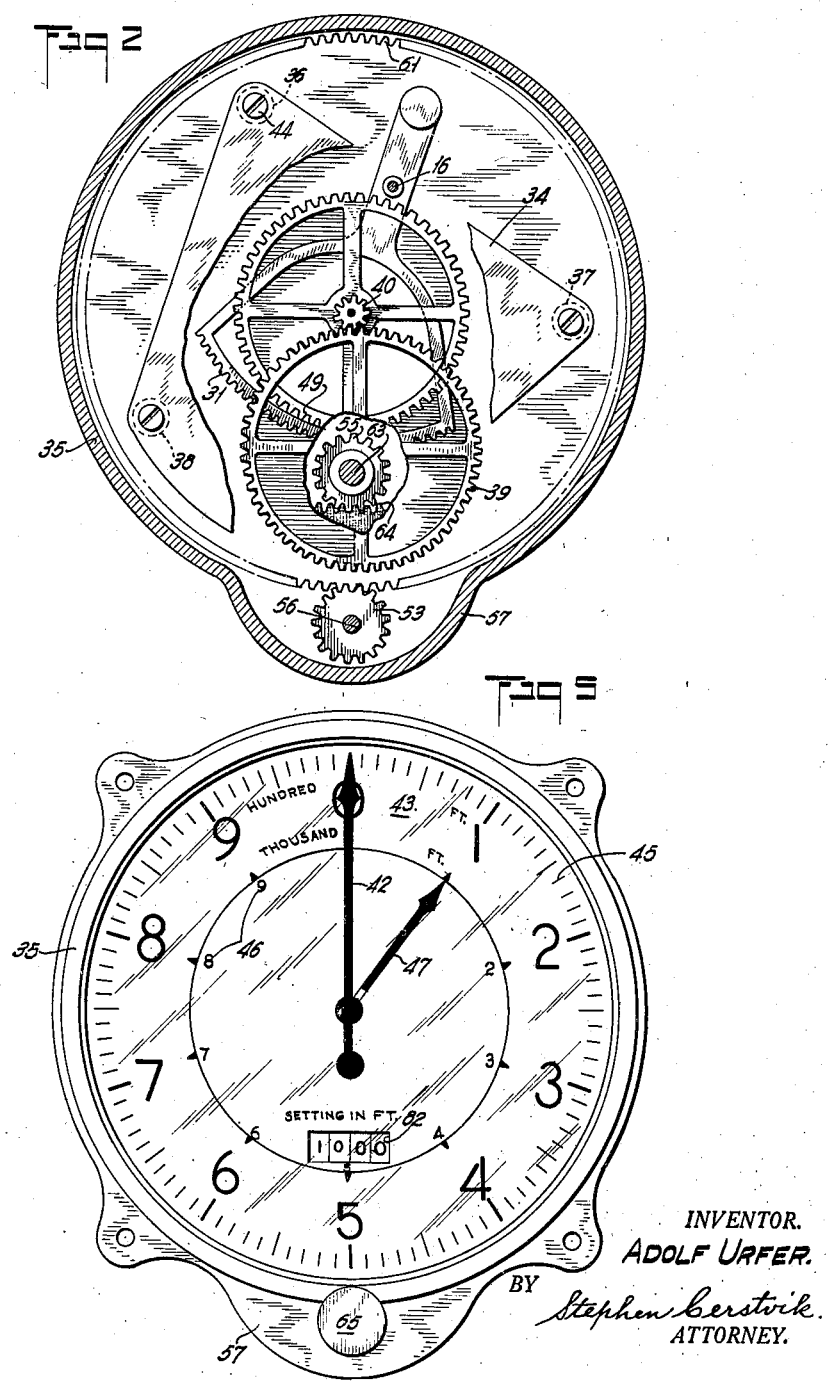

Dec. 17, 1935.  A. URFER  2,024,313
ALTIMETER
Filed April 2, 1932   3 Sheets-Sheet 3
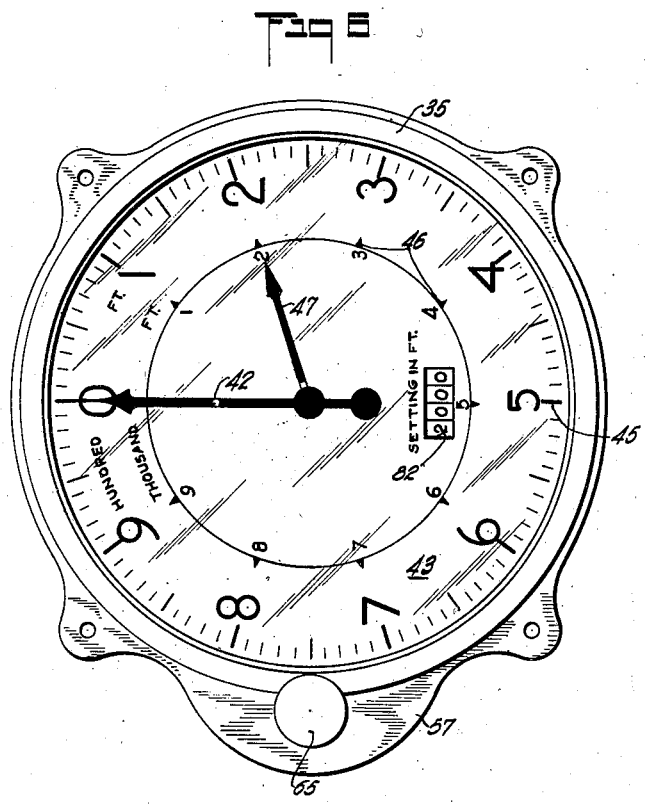
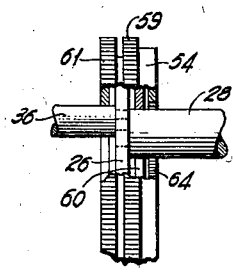
INVENTOR.
ADOLF URFER.
BY Stephen Gerstvik
ATTORNEY.

Patented Dec. 17, 1935

2,024,313

UNITED STATES PATENT OFFICE 2,024,313

ALTIMETER

Adolf Urfer, Richmond Hill, N. Y., assignor to Bendix Aviation Corporation, South Bend, Ind., a corporation of Delaware Application April 2, 1932, Serial No. 602,771

3 Claims. (Cl. 73—4)

The present invention is a continuation in part of that disclosed in my co-pending application Serial No. 595,169, filed February 25, 1932, and relates to indicating instruments, more particularly to sensitive instruments for indicating the altitude of an aircraft.

In devices of the above type, it is desirable that they be capable of adjustment under one condition for a second and predetermined condition, and so that they will indicate when said predetermined condition occurs or is reached. It is also desirable that the instrument be capable of adjustment to a position in which the pointer or one of a pair of pointers bears a definite relation to a condition desired to be maintained.

In altimeters, and particularly in sensitive altimeters embodying a plurality of scales and cooperating pointers for indicating altitude in hundreds and thousands of feet, the first adjusting feature mentioned above may be embodied therein in such a manner that the altimeter can be set at an airport having one pressure altitude with respect to sea level for a pressure altitude of another airport to and at which it is desired to fly and land, so that when the aircraft lands at the second airport the altimeter will indicate zero altitude, thereby providing the pilot with correct indications of the altitude of his craft with respect to the ground at the airport where he is going to land.

The second adjusting feature embodying the present invention may be accomplished by enabling the relation of the indicating instrument, that is the altimeter, to be adjusted with respect to the instrument mounting or instrument board.

For purposes ow illustrating the first adjusting feature, assume that a pilot is going to fly from airport No. 1, the pressure altitude of which is 500 feet above sea level, to airport No. 2, the altitude of which is 1000 feet above sea level. If the altimeter is not provided with adjusting means (except for adjusting to indicate zero at the particular altitude at which the craft is at the time) then when the pilot takes off from airport No. 1 and levels off to a flying altitude of say 2000 feet (2500 feet above sea level), upon reaching a position over airport No. 2 his altimeter will still indicate 2000 feet whereas his altitude above airport No. 2 is only 1500 feet. Thus, he would be led to believe that he is higher than he actually is, and this would cause him to misjudge his landing in view of the fact that he would be on the ground when his altimeter would still indicate 500 feet altitude. Therefore, an adjustment must be provided in the altimeter whereby the latter can be set at airport No. 1 for the altitude of airport No. 2 and to indicate such altitude on the instrument independently of its pointer scale, simultaneously causing relative movement between the pointers and their respective scales, so that when the aircraft reaches a position over airport No. 2 the altimeter will indicate by its pointers the true altitude above the airport and will show zero when the plane reaches the ground.

For purposes of illustrating the second adjustment let it be assumed that in the case of certain type of aircraft a law requires that between certain two cities aircraft must maintain an elevation of 2000 feet above sea level. In order to enable a level flight of 2000 feet above sea level to be maintained, means are provided whereby the operating mechanism of the altimeter may be rotated so that when an altitude of 2000 feet above sea level prevails, the large pointer is in a horizontal position. Under these conditions, when the craft starts to ascend the pointer immediately rises and when the craft starts to descend, the pointer moves downward from its horizontal position. Hence, the position of the pointer bears a definite relation to the altitude desired to be maintained and a variance from such altitude is immediately noticeable by a movement of the pointer in the direction in which the variance occurs. The reason for the second adjustment is that it is of greatest importance to maintain a uniform level during a flight so as to obviate loss of power and of time which attend frequent climbs.

Accordingly, one of the objects of the present invention is to provide a novel altimeter embodying novel adjusting and indicating means whereby the foregoing two adjustments may be made by the manipulation of a single member.

Another object of the invention is to provide in an indicating instrument, novel means whereby the instrument may be set for a predetermined condition and to indicate such condition upon its being reached and also to indicate the predetermined condition at the time that the instrument is set.

Another object is to provided in a sensitive altimeter, novel means whereby relative movement is produced between the scales and pointers for adjusting the altimeter so that it will produce a desired indication when a predetermined altitude is reached and for indicating such predetermined altitude when the setting is made.

Another object is to provide a novel sensitive altimeter embodying a plurality of scales and pointers relatively movable with respect to each other for indicating action and for setting to a predetermined condition so that a desired reading may be obtained from the scales when the predetermined condition is reached, and means independent of the scales and pointers for indicating the condition for which the instrument is set.

Another object is to provide an indicating instrument embodying novel means whereby the instrument may be adjusted to a position which bears a definite relation to a condition desired to be maintained when said instrument is indicating a performance contributing to a factor in the maintenance of such condition.

A further object of the invention is to provide an indicating instrument embodying a novel arrangement whereby the pointer or pointers of the instrument and the operating mechanism thereof may be displaced, either individually or in conjunction with each other, from a fixed position in relation to an instrument mounting or instrument board.

Still another object is to provide an instrument of the class described, embodying a novel structure which is relatively simple yet efficient in operation, and involving relatively few parts, whereby the instrument may be manufactured economically on a production basis.

The above and other objects and advantages of the invention will appear more fully hereinafter from a consideration of the detailed description which follows, taken together with the accompanying drawings, wherein is illustrated one embodiment of the invention. It is to be expressly understood, however, that the drawings are only for the purpose of illustration and description, and are not designed as a definition of the limits of the invention, reference being had for this purpose to the appended claims.

In the drawings, wherein like reference characters refer to like parts throughout the several views, Fig. 1 is a longitudinal sectional view through the casing showing the functional relationship of the various elements of one form of instrument, namely an altimeter, embodying the present invention;

Fig. 2 is a sectional view taken on line 2—2 of Fig. 1;

Fig. 3 is a sectional view taken on the line 3—3 of Fig. 1;

Fig. 4 is a detailed view, partly in section, taken on line 4—4 of Fig. 1 and showing the method of mounting the pressure responsive element for bodily movement thereof in adjusting the pointers of the instrument for a predetermined condition;

Fig. 5 is a front view of the instrument embodying the present invention and indicating an altitude of 1000 feet above the ground whose pressure altitude with respect to sea level is also 1000 feet;

Fig. 6 is another front view of the instrument embodying the present invention showing the pointers and operating mechanism adjusted to a position which bears a definite relation to existing conditions desired to be maintained during flight; and Fig. 7 is a detailed view with portions broken away of the gear assembly whereby the pointers of the instrument and the operating mechanism thereof may be displaced either individually or in conjunction with each other.

Referring to the drawings, and more particularly to Figs. 1, 2, and 3, the instrument embodying the present invention is shown in the form of an altimeter having an evacuated pressure-responsive element which is adapted to expand and contract upon variations of pressure due to changes in altitude, an amplification mechanism for amplifying the relatively small movements of the pressure-responsive element into readily discernible movements of a plurality of pointers over cooperating scales to indicate the altitude in feet, or in meters, or in terms of barometric pressure, if desired, the pointers being geared together in such a manner that one moves only a fraction of a revolution for one complete revolution of the other, the latter indicating the altitude in hundreds of feet and the former in thousands of feet, or in other units having the same or different ratios.

In the form shown, the pressure-responsive element comprises one or more aneroid capsules, such as, for example, 8 and 9, carried by a relatively stationary supporting member 10 but which is capable of adjustment, as will be pointed out hereinafter. Means are provided for employing and amplifying the movements of the aneroid capsules, upon actuation thereof due to changes in pressure, to produce indications which, as stated hereinbefore, may be in terms of barometric pressure or of altitude in feet or meters. In the form shown, said means comprise a pair of links 11 and 12 (Fig. 3) pivotally connected at 13, the link 11 being connected to the aneroid capsule 9 through a temperature-compensating element 14 and a bracket 15. The link 12 is rigidly connected to a rock-shaft 16 journaled in a member 17 for rocking movement upon actuation of the aneroid capsules 8 and 9. The bracket 15 is also connected to a pair of links 18 and 19 which are pivoted together at 20, the link 19 being in turn pivoted at 21. A counterweight 22 is carried by the link 19 and a spring 23 is also connected to link 19 and to a member 24 (Fig. 1) secured to or formed integral with a supporting member 25 so that the entire elastic system is balanced in order to prevent movement thereof due to vibrations, acceleration forces, etc. In other words, the rock-shaft 16 is actuated only by the capsules 8 and 9 through the links 11 and 12 and not by any undesirable and/or extraneous forces. The rock-shaft 16 is also journaled in and extends through a plate 26 interposed between a pair of large gears (Fig. 7) one of which is an external gear secured to said plate 26 and the other of which is an internal-external gear rotatable either with or independently of said plate as will be pointed out more fully hereinafter. The plate 26, together with another plate 27, forms a supporting structure for the aneroid capsules and the amplification mechanism, said plates being secured together in any suitable manner as, for example, by spacing rods 28, 29, and 30.

The rock-shaft 16 has secured thereto or formed integral therewith, a gear sector 31 which is arranged to mesh with a pinion 32, the latter being carried by a countershaft 33 journaled in the plate 26 and another plate 34 at the front of the instrument casing which is designated as 35. The plates 26 and 34 are also secured together in any suitable manner as, for example, by spacing rods 36, 37, and 38. Secured to or formed integral with the shaft 33 is a relatively large gear 39 which meshes with a pinion 40 carried at one end of a hollow shaft 41 which extends through the plate 34 and has secured thereto a large pointer 42. The pointer 42 is arranged to traverse a dial 43 which is secured to the plate 34 as by screws 44 and upon which is engraved or etched a scale 45 marked in hundreds of feet, for example. Concentric with the scale 45 is another scale 46 which is graduated in thousands of feet and has cooperating therewith a small pointer 47. In order that the pointer 47 shall move with respect to its scale 46 and with the pointer 42 in the ratio existing between scales 45 and 46, the pointers are geared together in such a manner that the pointer 47 moves only a fraction of a revolution for one complete revolution of pointer 42, and for this purpose another gear 48 is secured to or formed integral with the counter-shaft 33 and arranged to mesh with a relatively large gear 49, the latter being secured to or formed integral with a second pointer shaft 50 which is journaled in the plate 26 and extends through the hollow pointer shaft 41 to actuate the small pointer 47.

A cover-glass 51 of some suitable transparent material, which may be other than glass, is secured to the open end of the casing 35 in any suitable manner such as, for example, by means of a clamping ring 52, so that the pointers 42 and 47 can be viewed therethrough in their cooperation with their respective scales 45 and 46.

It will be apparent from the foregoing that as the aneroid capsules 8 and 9 are actuated by barometric pressure, the rock-shaft 16 is actuated through the links 11 and 12 to cause movement of the gear sector 31 thereby operating the pointers 42 and 47 in their proper ratio through the gear trains 32, 39, 40, and 32, 48, 49, respectively. It will also be apparent that the pointers 42 and 47 will indicate the altitude with respect to barometric pressure or sea level and not the true altitude with respect to the ground; that is, the pointers would indicate zero only when the instrument is at sea level under normal conditions and therefore it is desirable that the instrument be capable of adjustment to indicate zero when the instrument is on the ground with respect to sea level. It is further desirable that the instrument be capable of adjustment under one condition for a second condition and to indicate when the second condition occurs or is reached. To this end novel means are provided for making such adjustment and, in the form shown, comprise means for causing relative movement between the pointers and their respective scales, so that the pointers will indicate zero when the instrument reaches the altitude for which it was set. Said means include a gear train comprising a gear 53, a large internal-external gear 54 and a gear 55. The gear 53 is secured to or formed integral with a shaft 56 journaled in the front and rear walls of an enlarged portion 57 of the casing 35 and is arranged so that upon longitudinal movement thereof to the right as viewed in Fig. 1, against the compression of a coil spring 58, the gear 53 meshes with the external teeth 59 of the large gear 54, the latter being in the form of a ring gear carried by the plate 26 in rotatable engagement therewith or relative thereto by means of a ring 60 secured to the plate 26 and to a large external gear 61 by means of screws 62. The gear 55 is carried by a counter-shaft 63 journaled in the plate 26 and is arranged to mesh with the internal teeth 64 of the large gear 54. The shaft 56 is arranged to be actuated from the front of the casing 35 by means of a knob 65 whereby, when the gear 53 is in mesh with the teeth 59 the large gear 54 is rotated relative to the plate 26 thereby rotating the counter-shaft 63 through the internal teeth 64 and the gear 55.

Means are now provided whereby rotation of the counter-shaft 63 is caused to actuate the pointers 42 and 47 through the actuating and amplification mechanism which operates said pointers during indicating action by the expansion and contraction of the aneroid capsules 8 and 9. Said means include actuating means for bodily moving the aneroid capsules with respect to their support and in such a manner that the pointers are caused to move in the same way as when actuated by said capsules during indicating action. In the form shown, said means comprise a worm 66 secured to or formed integral with another counter-shaft 67 journaled in the plate 27 and in a bracket 68 carried by cross-member 69, said counter-shaft 67 having a pinion 70 on one end thereof which meshes with another pinion 71 carried by the counter-shaft 63. The worm 66 drives a worm gear 72 carried by an internally threaded member 73 journaled in the cross-member 69 which is secured to the spacing rods 29 and 30 in any suitable manner, as, for example, by screws 74 and 75. The internally threaded member 73 is arranged for threaded engagement with the supporting member 10, which is in the form of a threaded shaft and which carries the aneroid capsules 8 and 9, as shown in detail in Fig. 4. It will be apparent that upon rotation of the worm gear 72 the internally threaded member 73 will also rotate by virtue of its fixed relation with the worm gear 72, and the threaded member 73 will in turn tend to rotate the threaded shaft 10 and hence the capsules 8 and 9.

It is desirable to utilize this rotating tendency of the threaded shaft 10 to impart longitudinal bodily movement to the aneroid capsules and to this end means are provided for holding the shaft 10 against such rotation. In the form shown, said means comprise a pin 76 carried by a bracket 77 secured to the aneroid capsule 8, said pin 76 extending into a hole 78 formed in the cross-member 69. It will now be apparent that when the rotation of the shaft 10 is prevented by means of the pin 76 said shaft will move longitudinally in one direction or the other within the internally threaded member 73, depending upon the direction of rotation of the latter, and will thereby bodily move the capsules 8 and 9. The bodily movement of the capsules will then be transmitted to the pointers 42 and 47 through the amplification mechanism and their respective gear trains in the same manner as when the capsules expand or contract due to barometric pressure. Relative movement may be caused between the pointers 42, 47 and their respective scales 45, 46 to any degree which may be desired, so that said pointers will produce a desired indication on the scales as, for example, a zero reading, when the desired condition or pressure-level altitude for which the instrument is set has been reached.

It is also desirable that the condition for which the instrument is to be set may be indicated at the time the setting is being made so that such indication may be used as an always available reference of the particular condition which has been selected. In other words, if it be desired to set the pointers so that they will indicate zero when a certain altitude is reached it is essential that such condition be indicated at the time the setting is made and that the indication be maintained until the instrument is reset for another condition. As has been stated, it is essential that after the desired condition is indicated at the time of setting, it remain unchanged during the actuation of the pointers by the change from the starting condition to the preset condition and also that the pointers operate independently to indicate when the desired condition is reached, as for example, by producing a zero indication upon reaching an airport having a certain pressure-level altitude, the latter being susceptible to changes from day to day due to changes of barometric pressure. To this end means are provided whereby the indication of the desired condition for which the instrument is set is produced simultaneously with the bodily movement of the aneroid capsules. In the form shown, said means comprise a counter 79 carried by the plate 34 in any suitable manner as, for example, screws 80 and 81, and arranged so that the number carrying dials thereof are visible through an opening 82 provided in the plate 34 and dial 43 at any convenient point, as for example, within the scale 46.

The number carrying dials of the counter, which in the present instance are marked in feet, are actuated simultaneously with the setting of the pointers by means of the knob 65, through gears 53, 54, 55, and an extension 83 of the counter shaft 63, which extension carries a beveled pinion 84 meshing with a bevel gear 85.

It is believed to be apparent from the foregoing that when the knob 65 is actuated to adjust the instrument for a desired condition, relative movement is caused between the pointers and their respective scales through their respective gear trains and through the amplification mechanism by the bodily movement of the aneroid capsules 8 and 9 through the gear train 53, 54, 55, 71, 70, and the worm 66 and worm gear 72. Simultaneously with the bodily movement of the aneroid capsules the extension 83 of the countershaft 63 is also actuated, thereby causing the beveled pinion 84 to drive the bevel gear 85, thus rotating the number carrying dials of the counter 79 to indicate the condition for which the instrument has been set. Thereafter, the pointers are operated independently of the counter through their respective gear trains and through the amplification mechanism to produce the required indication on the scales 45 and 46 when the condition occurs or has been reached for which the instrument has been set, and which condition is indicated on the counter through the opening 82.

Assume, for example, that the instrument is at sea level under normal barometric pressure, at which time the pointers 42 and 47 indicate zero on their respective scales 45 and 46, and the number carrying dials of the counter also all indicate zero. If the pilot of a craft on which the instrument is mounted desires to fly to a landing field which has a pressure-level altitude of 1000 feet, for example, he now rotates the knob 65 until 1000 feet is indicated on the counter, at which time relative movement is also caused between the pointers 42 and 47 and the dial 43, so that they no longer indicate zero on their respective scales 45 and 46. The relative position of the pointers with respect to their scales is now such that they indicate 1000 feet away from the zero mark but will indicate zero when the pilot reaches the field for which he is flying and for which the instrument has been adjusted. The setting of the counter, however, remains unchanged during the indicating action of the pointers and until the instrument is again adjusted by means of the knob 65.

As pointed out hereinbefore, it is desirable that the instrument be capable of adjustment to a position in which the pointer or one of a pair of pointers bears a definite relation to a condition desired to be maintained. For this purpose means are provided whereby the relation of the instrument may be adjusted in respect to the instrument mounting or instrument board. In the form shown, said means include the relatively large external gear 61 which is arranged to mesh with and be driven by the gear 53 carried by the shaft 56 upon actuation of the knob 65 when the latter is in its outwardly extending position by virtue of the action of the coil spring 58. It will be apparent that since the gear 61 is rigidly secured to the plate 26, rotation of said gear 61 causes bodily rotation of the entire mechanism of the instrument including the pressure responsive elements and amplification mechanism carried by the plates 26 and 27, and including the pointers and their respective gear trains carried by the plates 26 and 34. In order to enable the mechanism to be rotated in this manner the plate 27 has secured thereto or formed integral therewith a stub shaft 86 journaled in a bearing sleeve 87 carried in a projection 88 formed centrally in the rear of the housing or casing 35.

It will now be apparent that when it is desired to adjust the pointers of the instrument so that they will indicate a desired reading when the predetermined condition is reached for which the instrument is to be set, the knob 65 is pushed inwardly against the compression of the spring 58 thereby meshing the gear 53 with the external teeth 59 of the gear 54, and the knob is then rotated until the predetermined condition is shown by the counter 79 in the opening 82 by virtue of the operation of the gears 55, 84, and 85. During this operation the pointers will also be actuated through their respective gear trains and the amplification mechanism by the bodily movement of the aneroid capsules 8 and 9 effected through the worm 66 and worm gear 72 because of the latter's connection to the gear 55 by the gears 70 and 71. After this setting is made the position of the large pointer 42 is then adjusted so that it will be horizontal, for example, for the condition to be maintained during flight as indicated in Fig. 6 of the drawings. This is accomplished by releasing the knob 65 outwardly by the action of the spring 58 until the gear 53 meshes with the gear 61 and rotating the knob until the pointer 42 is in the horizontal position shown in Fig. 6, in the manner set forth above. In Fig. 6 the instrument is shown set for flight toward a landing field whose pressure-level altitude is 2000 feet so that the pointers 42 and 47 will both indicate zero upon landing at that field. The instrument is also indicating that it is 2000 feet above the predetermined pressure-level altitude since the small pointer 47 is on the 2000 feet mark of the scale 46 and the horizontal position of the large pointer 42 indicates that the altitude is being maintained and any rise or depression of said pointer indicates that the altitude has been increased or decreased respectively.

There is thus provided a novel indicating device which may be set under one condition for a second condition so that it will indicate when the second condition occurs or is reached and which also indicates the condition for which it has been set, independently of the indicating action of the device, and, as pointed out hereinbefore, the invention is particularly suitable for use in a sensitive altimeter whereby a pilot can set his instrument at a flying field having one pressure-level altitude so that it will indicate zero when he reaches a second flying field whose pressure-level altitude is different from that of the first flying field and which altitude can be set into the instrument as a positive indication. Novel means are also provided whereby, after the foregoing adjustment is made, the entire mechanism including the pointers can be rotated so that one of the pointers will maintain a desired position for a predetermined condition of flight.

Although only one embodiment of the invention has been illustrated and described, other changes and modifications, which will now appear to those skilled in the art, may be made without departing from the scope of the invention. For example, the counter may be replaced by another type of indicator which is adapted for simultaneous actuation by the knob 65 and gears 53 and 54 when the adjustment is made between the pointers and their respective scales. It is also obvious that the reference scale or counter and the indicating scales may be calibrated in terms of barometric pressure as well as in feet or meters. Reference is therefore to be had to the appended claims for a definition of the limits of the invention.

What is claimed is:

1. An altimeter comprising a bodily movable aneroid adapted to be moved independently of its indicating action, scale means, a pointer, reference means for indicating a predetermined altitude or barometric pressure, said reference means comprising a counter having a plurality of interconnected numbering elements each provided with a set of numerals and movable to select for exhibition a single numeral from each set, said selected numerals constituting a figure representing the predetermined altitude or barometric pressure, unitary means for actuating said numbering elements to indicate said predetermined altitude or barometric pressure, and for simultaneously moving the pointer and aneroid in coordination with said numbering elements so that a predetermined relation is established between the pointer and the scale means, and means for moving the entire mechanism including the scale means, the pointer, the reference means and the unitary means for establishing a position of the pointer in which it bears a definite relation to an altitude desired to be maintained without changing the indication of the reference means and the relation between the pointer and the scale means.

2. An indicating instrument comprising a bodily movable actuating element adapted to be moved independently of its indicating action, scale means, a pointer, reference means for indicating a predetermined condition, said reference means comprising a counter having a plurality of interconnected numbering elements each provided with a set of numerals and movable to select for exhibition a single numeral from each set, said selected numerals constituting a figure representing said predetermined condition, unitary means for moving said numbering elements to indicate said predetermined condition and for simultaneously moving the pointer and actuating element in coordination with said numbering elements so that a predetermined relation is established between the pointer and scale means for the condition indicated by said reference means, and means for moving the entire mechanism including the scale means, the pointer, the reference means and the unitary means for establishing a position of the pointer in which said pointer bears a definite relation to a condition desired to be maintained without changing the indication of the reference means and the relation between the pointer and the scale means.

3. An indicating instrument comprising a bodily movable actuating element adapted to be moved independently of its indicating action, scale means, a pointer, reference means for indicating a predetermined condition, said reference means comprising a counter having a plurality of interconnected numbering elements each provided with a set of numerals and movable to select for exhibition a single numeral from each set, said selected numerals constituting a figure representing said predetermined condition, means for moving said numbering elements to indicate said predetermined condition and for simultaneously moving the pointer relatively to the scale means in coordination with said numbering elements so that a predetermined relation is established between the pointer and scale means for the condition indicated by said reference means, and means for moving the entire mechanism including the scale means, the pointer, the reference means and the actuating element for establishing a position of the pointer in which said pointer bears a definite relation to a condition desired to be maintained without changing the indication of the reference means and the relation between the pointer and the scale means.

ADOLF URFER.